(12) United States Patent
Pavlik

(10) Patent No.: US 9,476,794 B2
(45) Date of Patent: Oct. 25, 2016

(54) PRESSURE DECAY TESTING SYSTEM AND TESTING DEVICE FOR A CONNECTOR AND METHOD OF TESTING

(71) Applicant: ADVANCED SCIENTIFICS, INC., Millersburg, PA (US)

(72) Inventor: Rudolf Pavlik, Millersburg, PA (US)

(73) Assignee: Advanced Scientifics, Inc., Millersburg, PA (US)

( * ) Notice: Subject to any disclaimer, the term of this patent is extended or adjusted under 35 U.S.C. 154(b) by 430 days.

(21) Appl. No.: 13/934,684

(22) Filed: Jul. 3, 2013

(65) Prior Publication Data

US 2014/0007655 A1  Jan. 9, 2014

Related U.S. Application Data

(60) Provisional application No. 61/668,874, filed on Jul. 6, 2012.

(51) Int. Cl.
*G01M 3/08* (2006.01)
*G01M 3/26* (2006.01)

(52) U.S. Cl.
CPC ...................... *G01M 3/26* (2013.01)

(58) Field of Classification Search
CPC .. G01M 3/26; G01M 3/2869; G01M 3/2876; B29C 66/71; F16L 2201/30
USPC ........................................ 73/37, 46
See application file for complete search history.

(56) References Cited

U.S. PATENT DOCUMENTS

| | | | | |
|---|---|---|---|---|
| 4,799,377 | A * | 1/1989 | Strong et al. | 73/40 |
| 5,425,266 | A * | 6/1995 | Fournier | 73/49.7 |
| 5,637,837 | A * | 6/1997 | Merz et al. | 177/145 |
| 5,737,174 | A * | 4/1998 | Konieczynski | 361/220 |
| 6,360,794 | B1 * | 3/2002 | Turner | 141/329 |
| 2002/0085952 | A1 * | 7/2002 | Ellingboe et al. | 422/45 |
| 2003/0213285 | A1 * | 11/2003 | Wheeler et al. | 73/40.5 R |
| 2008/0027368 | A1 * | 1/2008 | Kollar et al. | 604/6.14 |

OTHER PUBLICATIONS

GE Healthcare, "ReadyMate Disposable Aseptic Connectors", Instructions to 28-9385-70-AC, 4 pgs. Jul. 2009.

* cited by examiner

*Primary Examiner* — Eric S McCall
*Assistant Examiner* — Mohammed E Keramet-Amircola
(74) *Attorney, Agent, or Firm* — Workman Nydegger

(57) ABSTRACT

A pressure decay testing system including a testing device for determining the reliability of connectors is provided and includes a pneumatic cylinder that raises and lowers a sealing member that closes a second end of a connector inserted in the device. A base member is adjacent pneumatic cylinder and includes a receiving surface having at least one receiving member for holding the connector. A channel is disposed therethrough though the receiving surface of the base member and aligns with an inner bore of the connector inserted in the testing device. An air line is attached to base member fluidly connecting inner bore of the connector with decay tester. Decay tester introduces a pressure differential through the channel to reach a predetermined set point pressure when the connector is closed by the testing device. Decay tester is configured to measure a change in pressure over time with respect to the predetermined set point.

19 Claims, 5 Drawing Sheets

PRESSURE DECAY TESTING SYSTEM AND TESTING DEVICE FOR A CONNECTOR AND METHOD OF TESTING

CROSS-REFERENCE TO RELATED APPLICATIONS

This patent application claims the benefit of U.S. Provisional Patent Application Ser. No. 61/668,874 filed on Jul. 6, 2012, titled "PRESSURE DECAY TESTING SYSTEM FOR A CONNECTOR AND METHOD OF TESTING," the disclosure of which is incorporated by reference as if fully rewritten herein.

FIELD OF THE INVENTION

This invention relates to testing systems, and more particularly, to a pressure decay tester system and testing device for a connector and a method for evaluating the integrity of such connectors.

BACKGROUND OF THE INVENTION

Flexible containers are commonly used for containment and delivery of medical fluids. These containers are generally single use bags manufactured from one or more types of plastic film and include connectors for receiving or dispensing contents of the containers. The containers are often used in life science applications and in the manufacture of pharmaceuticals to contain liquid raw materials prior to or during manufacture; in other cases such containers may be used to contain the finished product. The contents of these containers may be precious, particularly when used in large scale production. It is not unusual for even small containers to contain material worth many thousands of dollars.

Accordingly, it is beneficial to try to determine in advance whether the connector for a container may have an abnormality or defect that might result in loss of material through the connector.

One common solution employed for testing connector integrity is to use a vacuum test. The vacuum test applies a vacuum to the connector to test whether the connector will provide an effective seal. A defective part is indicated by a vacuum drop on a dial indicator of the testing equipment. The vacuum test only identifies very large connector seal leaks or missing seals; it does not identify small leaks in a seal provided by the connector. Additionally, the vacuum test may not identify a faulty seal because the set-up of the vacuum test can allow the connector to close the leak which does not flag the faulty connector.

These and other disadvantages are found in known systems and methods for testing the integrity of seals for connectors.

SUMMARY OF THE INVENTION

According to an exemplary embodiment of the present disclosure, a testing device is provided. The testing device includes a platform, pneumatic cylinder, a base member and an air line. The pneumatic cylinder is mounted on a support with the support being connected to the platform. The pneumatic cylinder is operable to raise and lower within the testing device. The pneumatic cylinder includes a sealing member operable to close a second end of a connector when inserted in the testing device. The base member is situated on the platform and aligned with the pneumatic cylinder. The base member includes a receiving surface having at least one receiving member therein for holding the connector when inserted in the testing device. The base member includes a channel disposed therethrough the receiving surface. The channel aligns with an inner bore of the connector when inserted in the testing device. The air line is attached to the base member to fluidly connect the channel of the base member and the inner bore of the connector with a decay tester.

According to another exemplary embodiment of the present disclosure, a pressure decay testing system is provided. The pressure decay testing system includes a decay tester and a testing device in fluid communication with the decay tester. The testing device includes a platform, pneumatic cylinder, a base member and an air line. The pneumatic cylinder is mounted on a support with the support being connected to the platform. The pneumatic cylinder is operable to raise and lower within the testing device. The pneumatic cylinder includes a sealing member operable to close a second end of a connector when inserted in the testing device. The base member is situated on the platform and aligned with the pneumatic cylinder. The base member includes a receiving surface having at least one receiving member therein for holding the connector when inserted in the testing device. The base member includes a channel disposed therethrough the receiving surface. The channel aligns with an inner bore of the connector when inserted in the testing device. The air line is attached to the base member to fluidly connect the channel of the base member and the inner bore of the connector with the decay tester. The decay tester is configured to introduce a pressure differential through the air line into the channel and the inner bore of the connector to reach a predetermined set point pressure when the second end of the connector is closed by the sealing member of the pneumatic cylinder. The decay tester is configured to measure a change in pressure over time with respect to the predetermined set point.

According to another exemplary embodiment of the present disclosure, a method of testing a connector for pressure decay is provided by using the decay tester system. The method includes providing the above described decay tester system for testing a connector. The connector is inserted in the testing device with the first end of the connector being situated in the base member of the testing device. The pneumatic cylinder of the testing device is actuated, wherein the sealing member of the pneumatic cylinder seals the second end of the connector creating a sealed connection. A pressure differential is introduced into the channel and inner bore of the connector via the decay tester to achieve a predetermined set point pressure in the sealed connection. An initial pressure is measured at the predetermined set point pressure in the sealed connection. A second pressure is measured after a predetermined period of time has passed in the sealed connection. The initial pressure is compared to the second pressure to determine reliability of the connector.

One advantage of an embodiment of the present disclosure includes a pressure decay test that identifies defective connector seal assemblies before use.

Yet another advantage of an embodiment of the present disclosure is that the method identifies good connector seal assemblies from bad or defective connector seal assemblies with a high level of confidence.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Provided is a pressure decay tester system and testing device for an aseptic connector and a method for evaluating the integrity of connectors.

Figure 1:
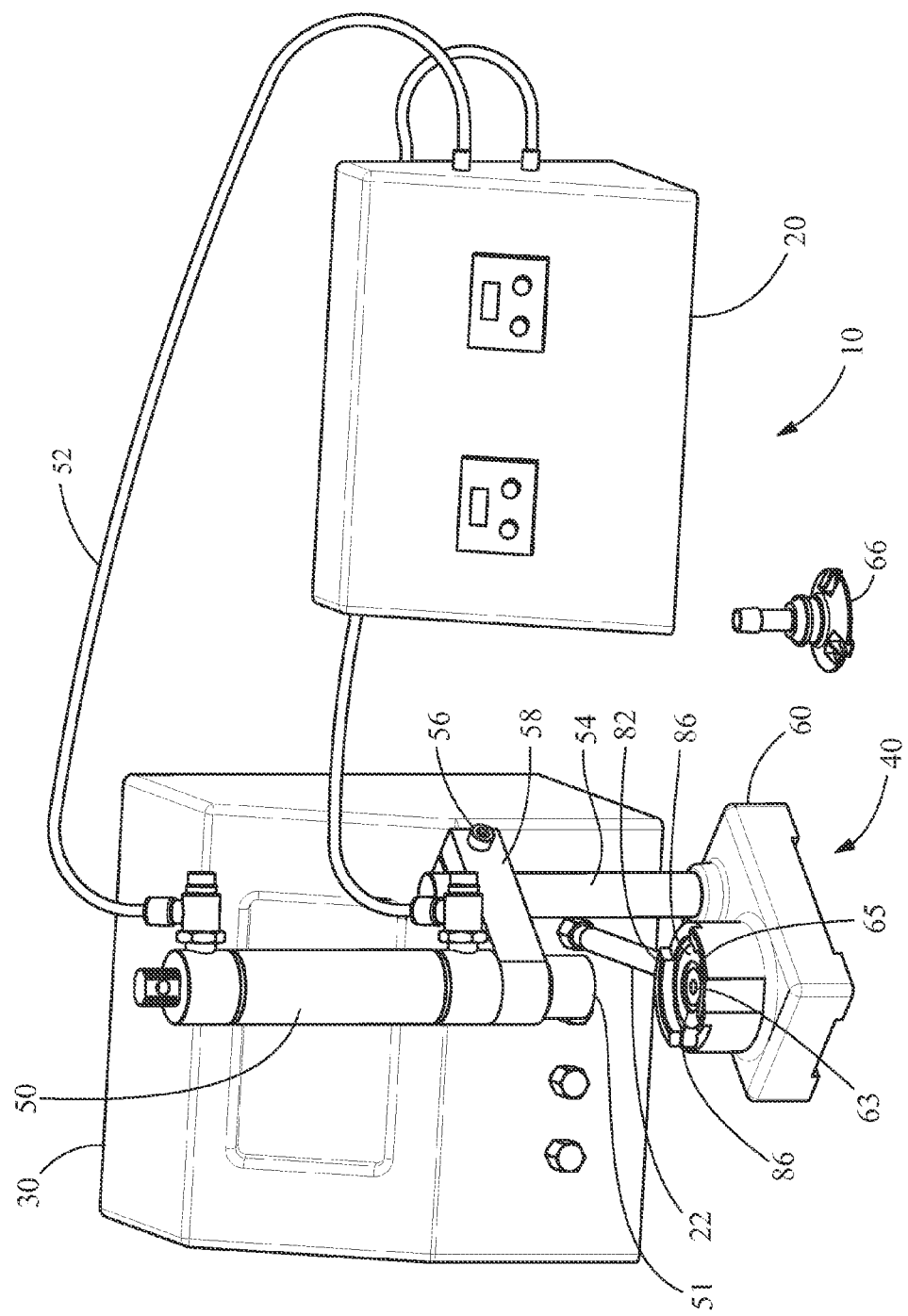
FIG. 1 is a perspective view of a pressure decay tester system in accordance with an exemplary embodiment.

FIG. 1 is a perspective view of a pressure decay tester system 10 in accordance with an exemplary embodiment. The pressure decay tester system 10 includes a decay tester 30. The decay tester 30 is any commercially available leak or flow tester, such as but not limited to, TME Solution™, available from TM Electronics, Inc. (Boylston, Mass.). The pressure decay tester system 10 also includes a testing device 40 in fluid communication with the decay tester 30 by at least one air line 22. The testing device 40 seals a connector 66 to be tested. Typically, the connector 66 to be tested is an aseptic connector for use with the medical devices that can be sterilized after testing to ensure its aseptic nature. The connectors 66 commonly employ an o-ring or other gasket or seal to prevent leaking of the contents of a container with which the container is subsequently employed.

As shown in FIGS. 1-4, the testing device 40 includes a platform 60, a pneumatic cylinder 50, a base member 62 and an air line 22 to test connector 66. The pneumatic cylinder 50 is mounted on a support 58 and the support 58 is connected to the platform 60 by a stand 54. The support 58 may include a knob 56 for adjusting the support on the stand 54 to change the height of the pneumatic cylinder 50 relative to the base member 62. The pneumatic cylinder 50 is operable to raise and lower within the testing device 40 and may be driven via lines 52 that are connected to a cylinder driver device 20. The pneumatic cylinder 50 includes a sealing member 51 operable to close a second end 78 opposite a first end 76 of a connector 66 when the connector 66 inserted in the testing device 40. Sealing member 51 completely seals or closes second end 78 of connector 66 simulating a connection the connector 66 would make during use. The base member 62 is situated on the platform 60 and aligned under the pneumatic cylinder 50. The base member 62 includes a receiving surface 84 having at least one receiving member 86 therein for holding or contacting the connector 66 when inserted in the testing device 40. The base member 62 includes a channel 63 disposed therethrough the receiving surface 84. An inner bore 68 of the connector 66 aligns with the channel 63 when the connector 66 is inserted in the testing device 40 (see FIGS. 3 and 4). An air line 22 is attached to base member 62 to fluidly connect the channel 63 of the base member 62 and the inner bore 68 of the connector 66 with the decay tester 30.

Figure 2:
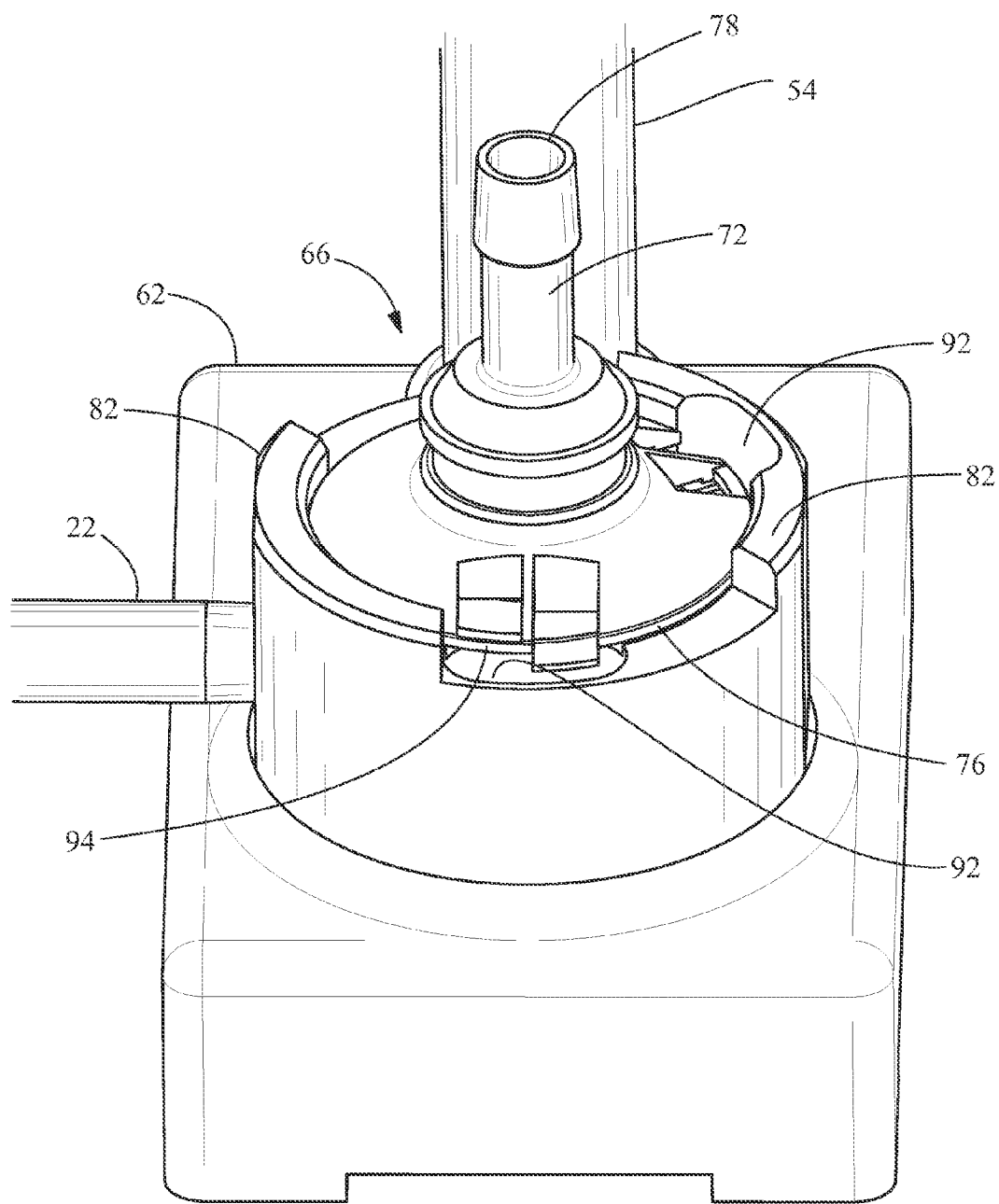
FIG. 2 is a front view of the testing device in accordance an exemplary embodiment.

As shown in FIG. 2, connector 66 is received and held by the base member 62. The connector 66 includes with an inner bore 68 formed between the first end 76 and the second end 78 of the connector. The outside of connector 66 includes a hose barb 72 on second end 78 that cooperates with sealing member 51 of pneumatic cylinder 50. In one embodiment, base member 62 includes a lip 82, partially or wholly surrounding connector 66. Lip 82 prevents the connector 66 from moving while situated in base member 62. The base member 62 includes a plurality of indents 92 to accommodate clips 94 of the connector 66.

Figure 3:
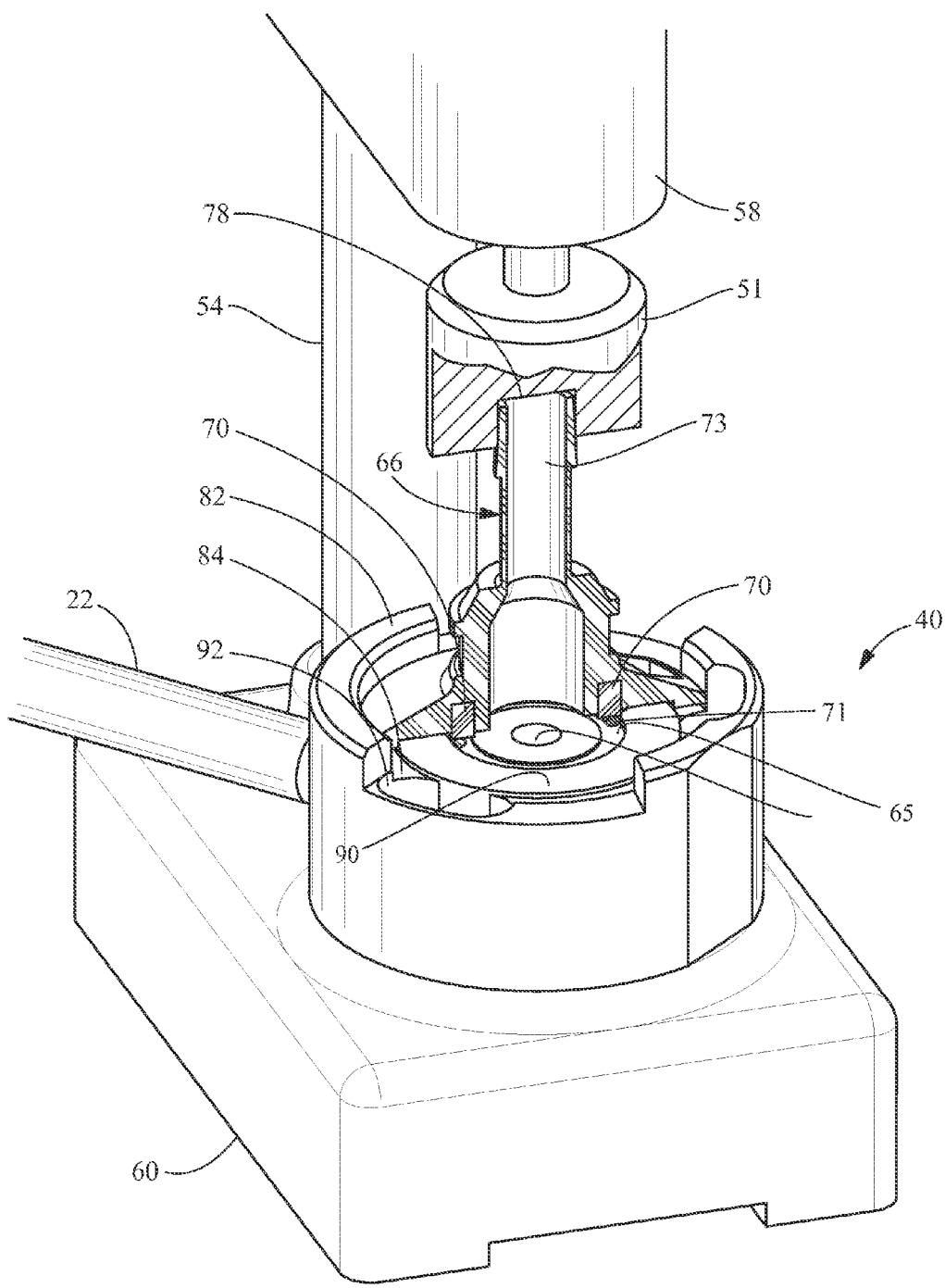
FIG. 3 is a perspective view of a pressure decay tester system in accordance with an exemplary embodiment.
Figure 4:
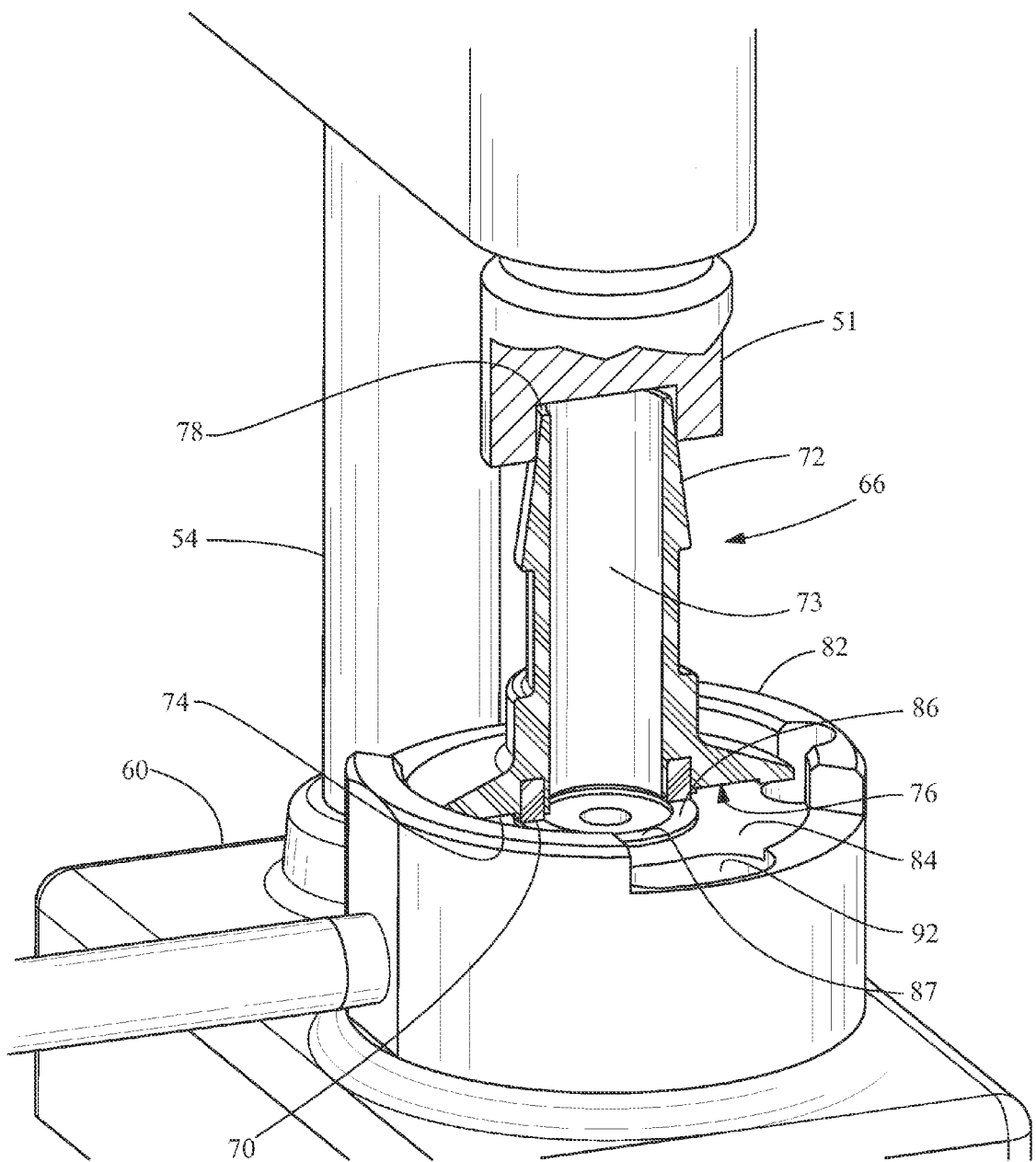
FIG. 4 is a front partial section view of the testing device and connector in accordance with an exemplary embodiment.

In one embodiment, as shown in FIG. 3, the at least one receiving member 86 of the base member 62 is a gasket receiving member 65 or a connector face receiving member 90 or both. As shown in FIG. 1, the gasket receiving member 65 is a recess 88 in the receiving surface 84 of the base member 62. The gasket receiving surface 65 is generally circular and surrounds the channel 63. The connector face receiving member 90 protrudes from the receiving surface 84 of the base member 62 and receives the connector face 74 of the first end 76 of the connector 66. The connector face receiving member 90 surrounds the channel 63 and the gasket receiving surface 65. In operation, as shown in FIG. 3, the recess 88 is adapted to receive a testing gasket 71. The testing gasket 71 cooperates with the gasket 70 of the connector 66. The connector face receiving member 90 cooperates with the connector face 74 on the first end 76 of the connector 66. As shown in FIGS. 3 and 4, when pneumatic cylinder 50 is actuated or closed, the sealing member 51 contacts and seals the second end 78 at or near the hose barb 72 of the connector 66, thereby forming a sealed connection between the first end 76 and the second end 78 of the connector 66. The air line 22 allows a pressure differential from the decay tester 30 to be introduced, either by applying a vacuum or introducing a gas, through the channel 63 and the inner bore 68 of the connector 66.

As shown in FIG. 4, in one embodiment, the receiving member 86 of the testing device 40 is a protrusion 87 that extends from the receiving surface 84. The protrusion 87 surrounds the channel 63 in the base member 62. When the connector 66 is inserted into the testing device 40, the protrusion 87 contacts the gasket 70 of the connector 66, thereby effectively sealing the first end 76 of connector. When, the pneumatic cylinder 50 is actuated and the sealing member 51 seals the second end 78 of the connector 66 a sealed connection is formed between the inner bore 68 of the connector 66 and the air line 22 leading to the pressure decay tester 30.

Once the connector 66 has been placed within the testing device 40 and the pneumatic cylinder 50 is lowered, the sealing member 51 seals the second end 78 of the connector 66 to prevent air flow. Then the decay tester 30 can be activated and work in accordance with generally known principles for conducting leak testing. In one embodiment, the air introduced by the decay tester 30 into the connector 66 simulates the pressure that a liquid would exert against the connector when employed in a filled container. In one embodiment, the decay connector 30 asserts a vacuum on the sealed connection simulating a connection. The decay tester 30 introduces a pressure differential by vacuum or air into the sealed connector 66 to achieve a predetermined set point pressure. The particular set point pressure may vary depending on a variety of factors, including the size of the connector 66 being employed and size of the container with which it will be used, which impacts the pressure that the connector (and the seal within it) is likely to experience in use.

After the set point pressure is reached, the decay tester 40 closes off the air flow or vacuum and locks or traps the air within the air line 22, the base member 62 and the connector 66. The decay tester 30 then measures the change in pressure over time. If the change in pressure (either loss or gain) exceeds a predetermined threshold within a predetermined period of time, that change of pressure is indicative of a faulty seal or other defect within the connector and the part can be rejected. Generally, the connector 66 is rejected if the measured change in pressure is greater than an industry recognized standard.

Figure 5:
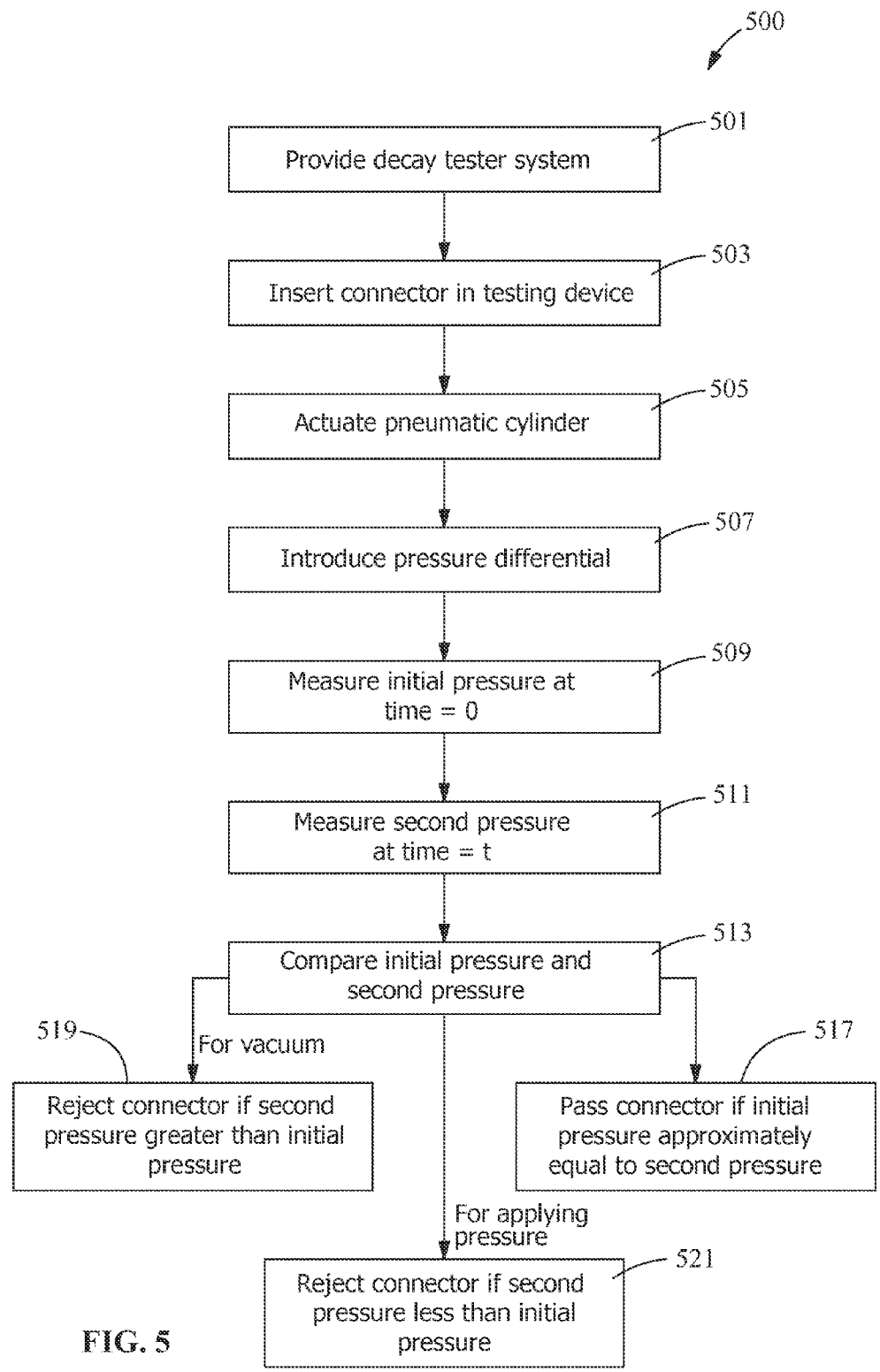
FIG. 5 is a flow chart of a method of testing a connector for pressure decay.
Figure 3:
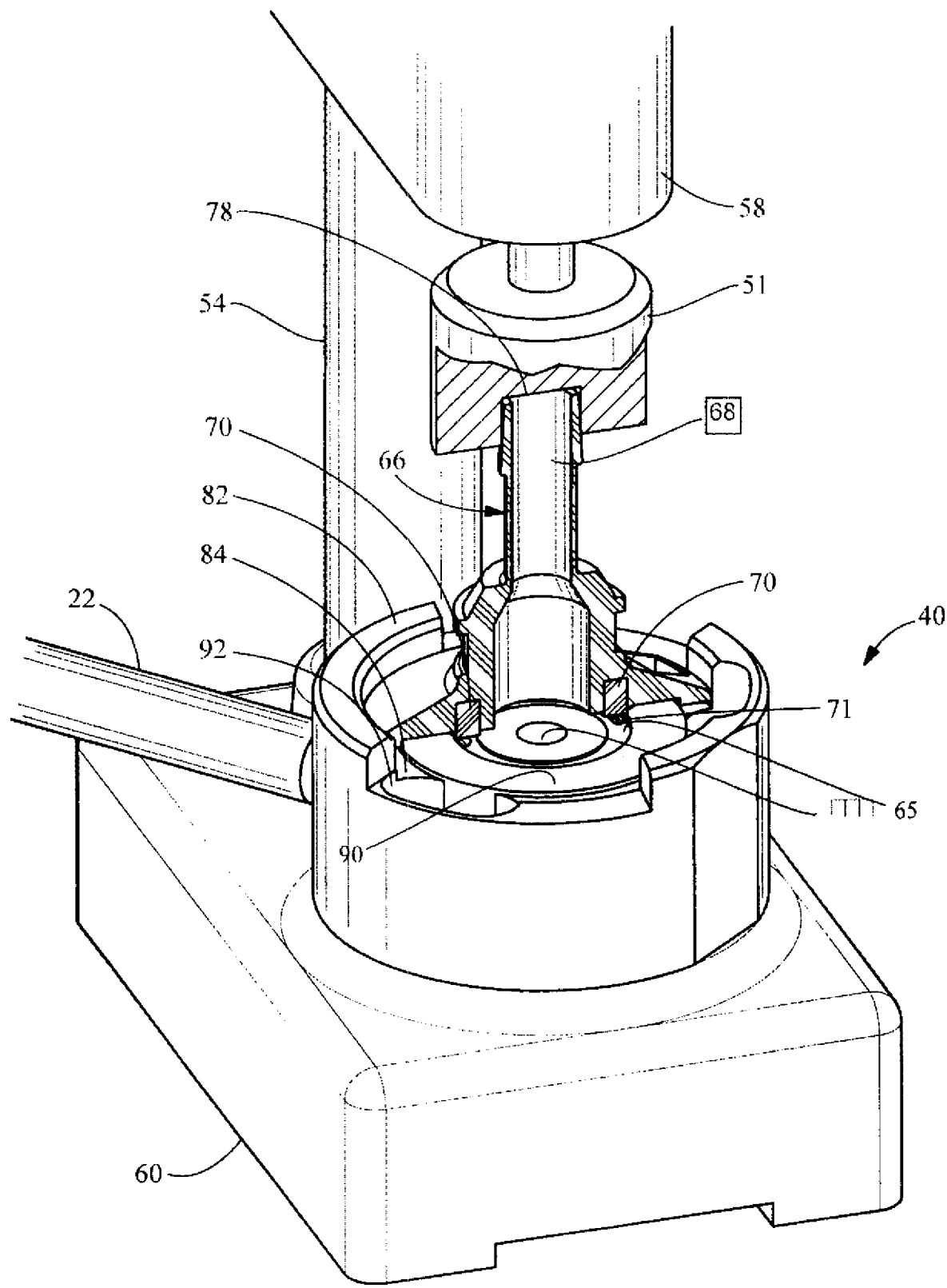
Figure 4:
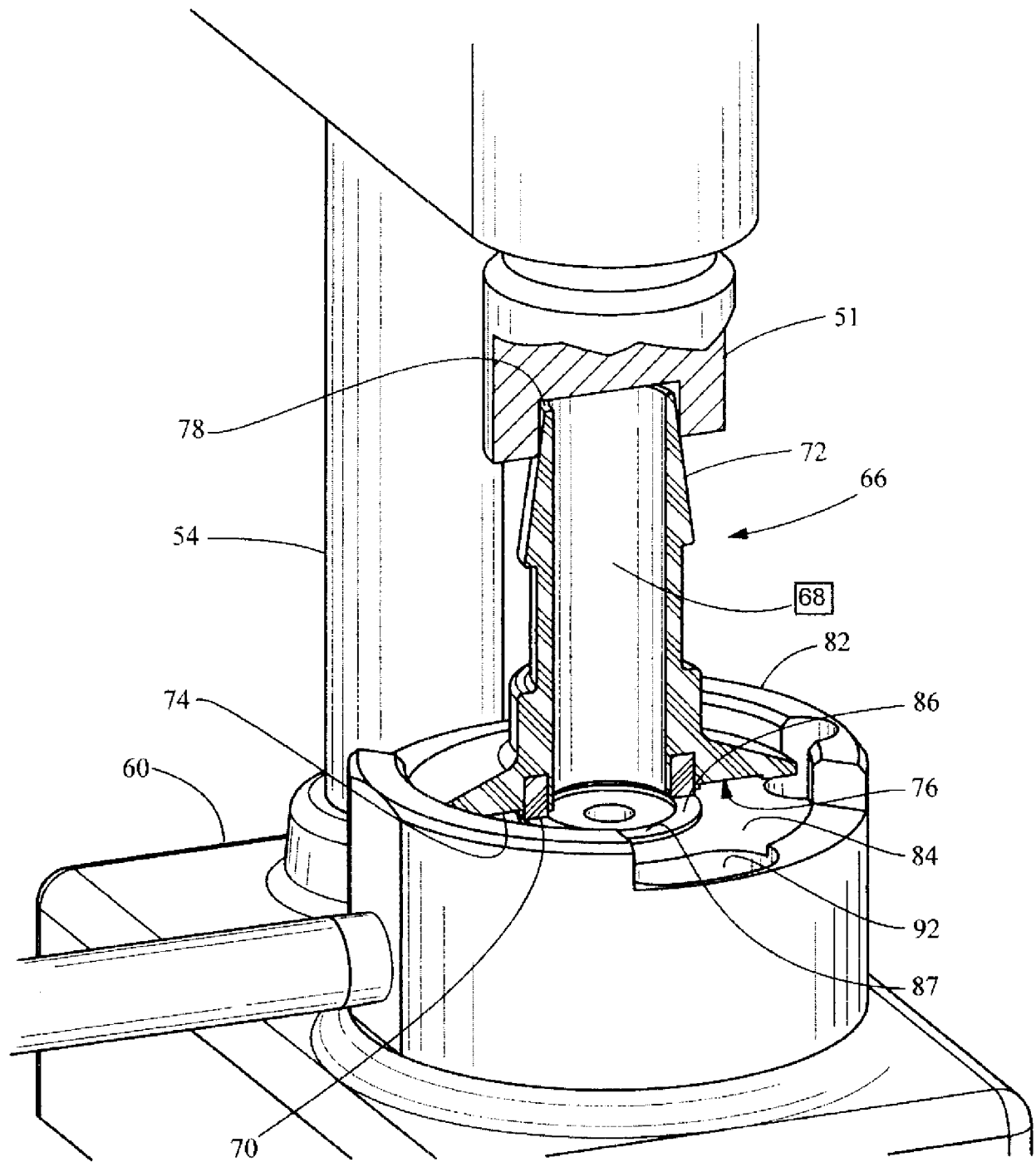

FIG. 5 illustrates a flow chart of the method 500 of testing a connector 66 for pressure decay. The method 500 includes providing the pressure decay tester system 10, step 501, inserting a connector 66 in the testing device 40, step 503, and actuating the pneumatic cylinder 50 to cover the connector 66, step 505. The method further includes introducing a pressure differential, either through vacuum or the addition of gas into the connector 66 from the decay tester 30, step 507, to achieve a pressure predetermined set-point threshold. Once the set-point pressure is reached an initial pressure of the connector is measured at time=0, step 509. This step is followed by measuring a second pressure at the connector 66 after a predetermined period of time has passed time, time=t, generally 15 seconds to 300 seconds, step 511, although the pressure may also be measured any number of intervals during that time and in some embodiments may be evaluated continuously. The method 500 then includes comparing the initial pressure (time=0) to the second pressure (time=t), and if there is little or no change from the initial pressure to the second pressure the connector 66 forms a good seal and the connector 66 is passed, step 517. For a system 10 using vacuum to test the connector 66, if the second pressure (time=t) is greater than the initial pressure (time=0) beyond a predetermined decay threshold, then the connector 66 is rejected because it is defective or does not form a proper seal, step 519. For a system 10 that introduces a gas to test the connector 66, if the second pressure (time=t) is less than the initial pressure (time=0) beyond a predetermined decay threshold, then the connector 66 is rejected because it is defective or does not form a proper seal, step 521.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A testing device for pressure decay testing a tubular connector having a first end and an opposing second end, the testing device comprising:
   a platform;
   a pneumatic cylinder having a movable end movable by a pneumatic pressure;
   a sealing member connected to the movable end of the pneumatic cylinder and operable to seal the second end of the connector;
   a base member situated on the platform and aligned with the sealing member, the base member including a receiving surface having at least one receiving member therein for holding the first end of the connector
   a channel disposed through at least a portion of the base member and providing fluid communication with the receiving surface;
   a pressure decay tester; and
   an air line extending between the pressure decay tester and the channel on the base member.

2. The testing device of claim 1, wherein the at least one receiving member is a gasket receiving member.

3. The testing device of claim 2, wherein the gasket receiving member is recessed in the receiving surface.

4. The testing device of claim 2, wherein the gasket receiving member protrudes from the receiving surface.

5. The testing device of claim 1, wherein the at least one receiving member is a connector face receiving member.

6. The testing device of claim 5, wherein the connector face receiving member protrudes from the receiving surface.

7. A pressure decay testing system comprising:
   a pressure decay tester;
   a testing device in fluid communication with the decay tester, the testing device including:
      a platform,
      a support connected to the platform,
      a pneumatic cylinder mounted on the support, the pneumatic cylinder having a movable end movable by a pneumatic pressure,
      a sealing member connected to the movable end of the pneumatic cylinder,
      a base member situated on the platform and aligned with the sealing member, the base member including a receiving surface having at least one receiving member therein, and
      a channel disposed through at least a portion of the base member and providing fluid communication with the receiving surface; and
      an air line attached to the base member to fluidly connect the channel of the base member with the decay tester;
   wherein the decay tester is configured to introduce a pressure differential through the channel to reach a predetermined set point pressure, and wherein the decay tester is configured to measure a change in pressure over time with respect to the predetermined set point.

8. The pressure decay testing system of claim 7, wherein at least one receiving member is a gasket receiving member.

9. The pressure decay testing system of claim 8, wherein the gasket receiving member is recessed in the receiving surface.

10. The pressure decay testing system of claim 8, wherein the gasket receiving member protrudes from the receiving surface.

11. The pressure decay testing system of claim 7, wherein the at least one receiving member is a connector face receiving member.

12. The pressure decay testing system of claim 11, wherein the connector face receiving member protrudes from the receiving surface.

13. A method of testing a connector for pressure decay, the method comprising:
   inserting a connector in a testing device, a first end of the connector being situated on a receiving surface of a base member of the testing device;
   actuating a pneumatic cylinder of the testing device; so as to move a sealing member of the pneumatic cylinder toward the connector creating a sealed connection between the sealing member and a second end of the connector;

introducing a pressure differential into an inner bore of the connector through a channel in the base member in fluid communication with the first end of the connector to achieve a predetermined set point pressure in the sealed connection;

measuring an initial pressure in the sealed connection at the predetermined set point pressure;

measuring a second pressure in the sealed connection after a predetermined period of time has passed; and comparing the initial pressure to the second pressure to determine reliability of the connector.

14. The method of claim 13, wherein the pressure differential is created by applying a vacuum to the sealed connection.

15. The method of claim 13, wherein the pressure differential is created by applying a gas to pressurize the sealed connection.

16. The method of claim 13, wherein the at least one receiving member is a gasket receiving member.

17. The method of claim 16, wherein the gasket receiving member is recessed in the receiving surface.

18. The method of claim 16, wherein the gasket receiving member protrudes from the receiving surface.

19. The method of claim 13, wherein the at least one receiving member is a connector face receiving member.

* * * * *

UNITED STATES PATENT AND TRADEMARK OFFICE
CERTIFICATE OF CORRECTION

PATENT NO. : 9,476,794 B2
APPLICATION NO. : 13/934684
DATED : October 25, 2016
INVENTOR(S) : Pavlik Page 1 of 3

It is certified that error appears in the above-identified patent and that said Letters Patent is hereby corrected as shown below:

In the Drawings

Sheet 3, replace Fig. 3 with the figure depicted on the attached sheet, wherein the reference number "73" has been changed to --68-- and the reference numbers --63-- and --88-- have been added Delete Drawing Sheet 4 of 5 and substitute therefore with the attached Drawing Sheet 4 of 5 consisting of FIG. 4

In the Specification

Column 2
Line 3, change "disposed therethrough the" to --disposed through the--
Line 26, change "disposed therethrough the" to --disposed through the--

Column 3
Lines 8-9, change "accordance an exemplary" to --accordance with an exemplary--
Lines 61-62, change "disposed therethrough the" to --disposed through the--

Column 5
Line 24, change "passed time, time=t" to --passed, time=t--

Signed and Sealed this
Eighteenth Day of April, 2017

Michelle K. Lee
*Director of the United States Patent and Trademark Office*